Patented Oct. 24, 1950

2,526,680

UNITED STATES PATENT OFFICE 2,526,680

SALTS OF PHOSVITIN FROM EGG YOLK AND METHOD FOR PRODUCING THE SAME

Dale K. Mecham, Richmond, Calif., assignor to the United States of America as represented by the Secretary of Agriculture No Drawing. Application January 28, 1949, Serial No. 73,433

9 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to a protein, herein named phosvitin, its isolation from avian egg yolk, and to certain of its derivatives, such as its cation salts, particularly its ammonium salt and its metal salts.

Insofar as known to me, phosvitin has not prior to this invention been isolated or discovered. It is particularly characterized by its high phosphorus content (about 9.5 to 10.5%). It contains about 11.5 to 12.5% nitrogen (Na salt) and less than 0.1% sulphur. The number average molecular weight as determined by osmotic pressure measurements is from 18,000 to 25,000. It is a substantially homogeneous material as determined by electrophoretic analysis. The amino acid serine is present to the extent of about 35% as determined by analysis of phosvitin hydrolysates. It is a white to yellowish-white solid material. Aqueous solutions of its ammonium or alkali metal salts are not precipitated by heat but may be precipitated by 5% trichloracetic acid or by 50% alcohol. Titration data show that the phosphorus content of phosvitin is present as ortho phosphate ester. Because of the presence of this large proportion of phosphate ester, phosvitin is capable of forming salts in the same general manner as compounds such as glycerophosphoric acid and mono-ethyl phosphate. The ammonium, potassium, and sodium salts of phosvitin are soluble in water while many of its salts with polyvalent metals such as barium, lead, nickel, copper, iron and so forth, are not. It also forms salts with organic bases such as amines, quaternary ammonium hydroxides, ternary sulphonium hydroxides, proteins, and so forth. It is resistant to digestion by whole pancreas extract but becomes digestible after removal of the phosphate groups with orange or grapefruit phosphatase.

Phosvitin and its salts are useful for special feeding purposes in human and animal nutrition.

In general, according to the invention, the phosvitin is isolated by mixing avian egg yolk with a dilute solution of a magnesium salt. By this treatment the phosvitin is precipitated along with some other protein and the precipitate is easily separated. The crude phosvitin thus obtained is then mixed with a dilute solution of a soluble ammonium salt, preferably under acid conditions. By mixing this solution with ether, the undesired proteins are precipitated and the liquid phase is readily removed. The liquid phase so obtained can be treated in any of several ways to isolate the phosvitin therefrom. For example, the phosvitin may be precipitated by addition of trichloracetic acid or alcohol or by dialysis techniques. Addition of a salt of a polyvalent metal such as barium or copper sulphate will precipitate the phosvitin as its barium or copper salt, respectively.

The following examples exhibit the invention in greater detail.

EXAMPLE I

*Isolation of phosvitin as its ammonium salt*

To 315 grams of egg yolk, 157.5 ml. of aqueous 1.2 molar magnesium sulphate solution was added and the mixture stirred for about an hour until solution of the egg yolk took place. 1575 ml. of water was then added to the solution while stirring constantly. After thorough agitation, the mixture was allowed to stand overnight, a few drops of toluene being added to prevent microbial action. The next day the mixture was centrifuged to separate the precipitated crude phosvitin. The protein portion of this precipitate contained about 50% phosvitin and about 50% of other egg yolk proteins.

The precipitate of crude phosvitin thus obtained was dispersed in sufficient aqueous 0.4 molar ammonium sulphate solution to give a total volume of 250 ml. During the dispersion sufficient dilute sulphuric acid was added to adjust the pH of the solution to 4.0. Further, 12.5 ml. of molar acetate buffer (pH 4.0) was added during the dispersion to maintain the pH at the required level. The solution so obtained was shaken vigorously with 125 ml. of ether. The resulting creamy mass was placed in suitable vessels and subjected to centrifugal action whereby a three-phase system was established—an upper ether layer containing fatty materials, an intermediate gel-like layer consisting mostly of the undesired egg yolk proteins, and a lower aqueous layer containing the phosvitin. This lower aqueous layer was separated by decanting. The gel-like intermediate layer was extracted twice for recovery of additional amounts of phosvitin. To this end, the intermediate layer was extracted with 200 ml. of 0.4 molar ammonium sulphate solution containing acetate buffer at pH 4.0 and 75 ml. of ether. In the second extraction, 120 ml.

of 0.4 molar ammonium sulphate solution was used containing acetate buffer at pH 4.0 and 100 ml. of ether. In each case the centrifugation and phase separation was carried out as previously described.

The aqueous extracts containing phosvitin were combined (volume 500 ml.) and air bubbled through it for several hours to remove residual ether.

The aqueous solution of phosvitin thus obtained was placed in a cell made of a semi-permeable membrane and subjected to dialysis against a saturated aqueous solution of ammonium sulphate adjusted to a pH of 4.0 by the addition of acetic acid. After the dialysis was complete, the cell contained the ammonium salt of phosvitin suspended as a precipitate in the concentrated aqueous solution of ammonium sulphate. The precipitate was removed by centrifuging, then resuspended in water and dialyzed against water to remove ammonium sulphate. The purified material was then dried by lyophilization (subjection to vacuum while in the frozen state). A yield of 3.1 grams of the ammonium salt of phosvitin was obtained having a phosphorus content of 10.2%. The product contained 65.5% of the protein-phosphorus contained in the original egg yolk.

In the first part of the above example relating to isolation of the crude phosvitin, the purpose is to precipitate substantially all the phosvitin as the magnesium salt while retaining in solution as great a part of other proteins as possible. To this end the egg yolk is subjected to the action of a dilute aqueous solution of a magnesium salt. Although magnesium sulphate is preferred, one can use other water-soluble magnesium salts, for example, magnesium chloride, magnesium acetate, magnesium bromide, etc. The point is to obtain the presence of the magnesium ions, the particular anion being unimportant. The concentration of magnesium salt may be varied from about .05 to 0.2 molar, 0.1 molar being preferred. The proportion of volume of egg yolk to volume of magnesium salt solution is not critical within a wide range. Generally, about 4 to 10 volumes of magnesium salt solution per volume of egg yolk gives good results. The example exhibits the preferred method of carrying out the crude phosvitin precipitation. To this end, the egg yolk is contacted with a solution of a magnesium salt which is of sufficient concentration to dissolve the egg yolk completely. Water is then added to bring the magnesium salt concentration within the above-specified range for the precipitation. By this technique, the phosvitin precipitate is especially low in concentration of undesired impurities.

The second part of the example relates to the separation of the phosvitin from the crude product. To this end the crude phosvitin is contacted with a dilute solution of a soluble ammonium salt in the presence of ether and under acid conditions. Although ammonium sulphate is preferred, one can use ammonium acetate, ammonium chloride, ammonium nitrate or other water-soluble ammonium salts. The concentration of salt should be from about 0.3 to about 0.5 molar, a concentration of 0.4 molar being preferred. The pH of the mixture should be below 4.5, 4.0 being preferred. The pH adjustment is obtained by adding an acid, for example, sulphuric acid, hydrochloric acid, acetic acid, and so forth. To maintain the pH at the desired level, it is often advantageous to add a buffer. Any of the known buffers of the desired pH range may be used, sodium acetate buffer being preferred. Ether is added to the mixture being treated to remove fatty materials by dissolving them in a separate phase and to cause coagulation of the undesired proteins. The amount of ether is not critical within a wide range. Generally, enough ether is added so that after extraction is complete a distinct ether phase will separate. In general about ½ volume of ether per volume of salt solution gives good results. Larger amounts can be used with no increase in efficiency.

EXAMPLE II

*Preparation of phosvitin*

A sample of the ammonium salt of phosvitin prepared in accordance with Example I was dissolved in water and concentrated hydrochloric acid was added until the pH of the mixture was below 1. The precipitated phosvitin was filtered off and dialyzed against water to remove the inorganic ions and finally dried by lyophilization to obtain the dry phosvitin in its acid state, i. e., containing unneutralized phosphoric acid groups.

EXAMPLE III

*Preparation of the sodium salt of phosvitin*

A sample of ammonium salt of phosvitin prepared in accordance with Example I was dissolved in water and dialyzed against an aqueous solution of sodium chloride. Thereby the solution remaining in the cell consisted essentially of a solution of the sodium salt of phosvitin and excess sodium chloride. This solution was subjected to dialysis against water to remove the sodium chloride, and the resulting solution of sodium salt of phosvitin was subjected to lyophilization to obtain the dry product.

EXAMPLE IV

*Preparation of copper salt of phosvitin*

A sample of the ammonium salt of phosvitin prepared in accordance with Example I was dissolved in water. An aqueous solution of copper suphate was added until precipitation was complete. The greenish-blue precipitate of the copper salt of phosvitin was filtered off and dried by lyophilization.

Examples II, III, and IV show the process of preparing the phosvitin itself and its sodium and copper salts using the separated ammonium salt of Example I as the starting material and dissolving this in water. It will be noted from the latter part of Example I, however, that the ammonium salt is obtained in aqueous solution prior to drying the solution and this solution can be used in any of Examples II, III and IV as the starting material, thus making it possible to obtain the product of these examples directly without the necessity of isolating the ammonium salt from its aqueous solution.

In Example II other strong acids such as hydrobromic, sulphuric, and so forth, may be substituted for the hydrochloric acid.

Having thus described the invention, what is claimed is:

1. A process for isolating phosvitin from avian egg yolk comprising mixing the egg yolk with a dilute solution of a magnesium salt having a molar concentration from about 0.05 to about 0.2 to precipitate the phosvitin, and separating the formed crude phosvitin precipitate.

2. A process for isolating phosvitin from avian egg yolk comprising mixing the egg yolk with a dilute solution of a magnesium salt having a molar concentration from about 0.05 to about 0.2 to precipitate the phosvitin, separating the formed crude phosvitin precipitate, mixing this crude phosvitin precipitate with a dilute solution of a soluble ammonium salt, mixing the solution thus obtained with ether to precipitate undesired proteins, and removing the liquid phase containing phosvitin.

3. A process for isolating phosvitin from avian egg yolk comprising mixing the egg yolk with a solution of a magnesium salt having a molar concentration from about 0.05 to about 0.2 to precipitate the phosvitin, separating the formed crude phosvitin precipitate, mixing this crude phosvitin precipitate with a solution of a soluble ammonium salt having a molar concentration of from about 0.3 to about 0.5, mixing the solution thus obtained with ether to precipitate undesired proteins, and removing the liquid phase containing phosvitin.

4. A process for isolating phosvitin from avian egg yolk comprising mixing the egg yolk with a solution of magnesium sulphate having a molar concentration of about 0.1 to precipitate the phosvitin, separating the formed crude phosvitin precipitate, mixing the crude phosvitin precipitate with a solution of soluble ammonium sulphate having a molar concentration of about 0.4 and a pH of about 4.0, mixing the solution thus obtained with ether to precipitate undesired proteins, and removing the liquid phase containing phosvitin.

5. A salt of phosvitin with an inorganic cation.
6. A salt of phosvitin with a metal.
7. The ammonium salt of phosvitin.
8. The sodium salt of phosvitin.
9. The copper salt of phosvitin.

DALE K. MECHAM.

REFERENCES CITED

The following references are of record in the file of this patent:

UNITED STATES PATENTS

| Number | Name | Date |
| --- | --- | --- |
| 2,454,915 | Fevold et al. | Nov. 30, 1948 |

OTHER REFERENCES

Jukes et al., Journal of Nutrition, Jan., 1932, vol. 5, pp. 81 to 101, especially page 86.